United States Patent
Peck et al.

(10) Patent No.: US 9,297,397 B2
(45) Date of Patent: Mar. 29, 2016

(54) SNAP LOCK DECKING SYSTEM

(71) Applicant: MarPec, Inc., Cedar Rapids, IA (US)

(72) Inventors: Robert William Peck, Cedar Rapids, IA (US); Mark William Loughren, Mt. Vernon, IA (US)

(73) Assignee: MARPEC, INC., Cedar Rapids, IA (US)

( * ) Notice: Subject to any disclaimer, the term of this patent is extended or adjusted under 35 U.S.C. 154(b) by 0 days.

(21) Appl. No.: 14/215,546

(22) Filed: Mar. 17, 2014

(65) Prior Publication Data

US 2014/0260041 A1    Sep. 18, 2014

Related U.S. Application Data

(60) Provisional application No. 61/786,325, filed on Mar. 15, 2013.

(51) Int. Cl.
*F16B 5/06*        (2006.01)
*E04F 15/02*       (2006.01)

(52) U.S. Cl.
CPC ......... *F16B 5/0685* (2013.01); *E04F 15/02044* (2013.01); *E04F 15/02183* (2013.01); *F16B 5/0664* (2013.01); *E04F 2015/021* (2013.01); *E04F 2015/02072* (2013.01)

(58) Field of Classification Search
CPC . E04B 2/58; E04B 2/7457; E04B 2002/7466; E04D 3/3605; E04F 13/0826; E04F 15/02183; F16B 5/0685
USPC ....................................................... 52/489.1
See application file for complete search history.

(56) References Cited

U.S. PATENT DOCUMENTS

| | | | | |
|---|---|---|---|---|
| 3,620,027 A | * | 11/1971 | Nordell | 405/219 |
| 3,910,561 A | * | 10/1975 | Fornells | E04H 17/1408 |
| | | | | 256/19 |
| 4,964,618 A | * | 10/1990 | Kennedy et al. | 256/24 |
| 5,048,448 A | * | 9/1991 | Yoder | 114/263 |
| 5,613,339 A | * | 3/1997 | Pollock | B63B 3/48 |
| | | | | 114/263 |
| 5,617,689 A | * | 4/1997 | Beane | E04C 3/06 |
| | | | | 52/177 |
| 5,735,097 A | * | 4/1998 | Cheyne | 52/489.1 |
| 6,112,479 A | * | 9/2000 | Andres | 52/177 |
| 6,339,908 B1 | * | 1/2002 | Chuang | E04F 15/04 |
| | | | | 52/177 |
| 6,695,541 B1 | * | 2/2004 | Spence | E02B 3/068 |
| | | | | 114/263 |
| 7,329,068 B2 | * | 2/2008 | Ungurean | E01C 9/083 |
| | | | | 404/35 |
| 8,789,331 B2 | * | 7/2014 | Bol | B63B 3/68 |
| | | | | 52/489.1 |
| 2002/0056238 A1 | * | 5/2002 | Leines | 52/177 |
| 2004/0020136 A1 | * | 2/2004 | Hauck | 52/11 |

* cited by examiner

*Primary Examiner* — Charles A Fox
*Assistant Examiner* — Joseph J Sadlon
(74) *Attorney, Agent, or Firm* — Richards Patent Law P.C.

(57) ABSTRACT

The present disclosure provides a decking system including a receiver and deck plank, wherein the plank removeably connects to receiver for installation. For example, the receiver may provide a snap lock function that secures and automatically spaces the deck planks on the receiver, which is fastened to a deck joist. In addition, the system is designed to conceal fasteners used to attach the system to the deck joist.

15 Claims, 3 Drawing Sheets

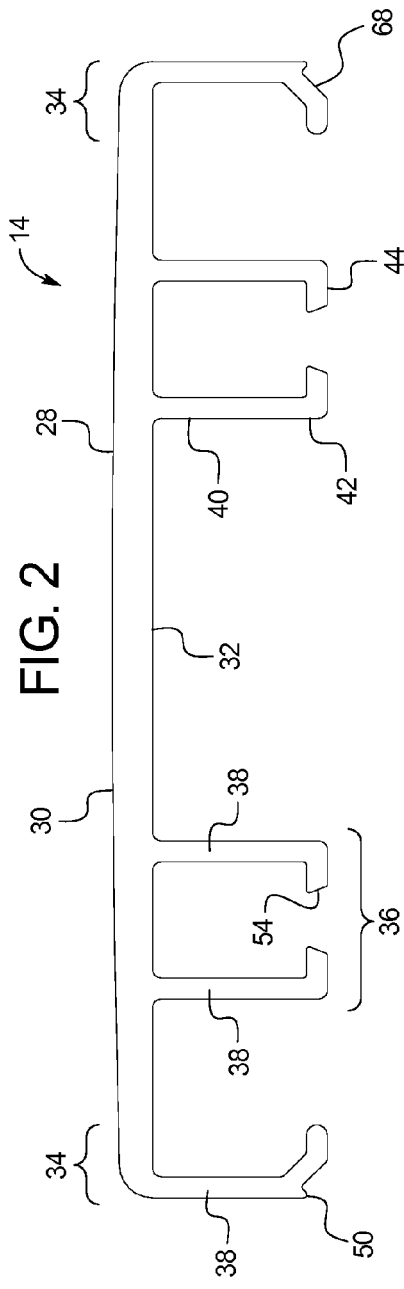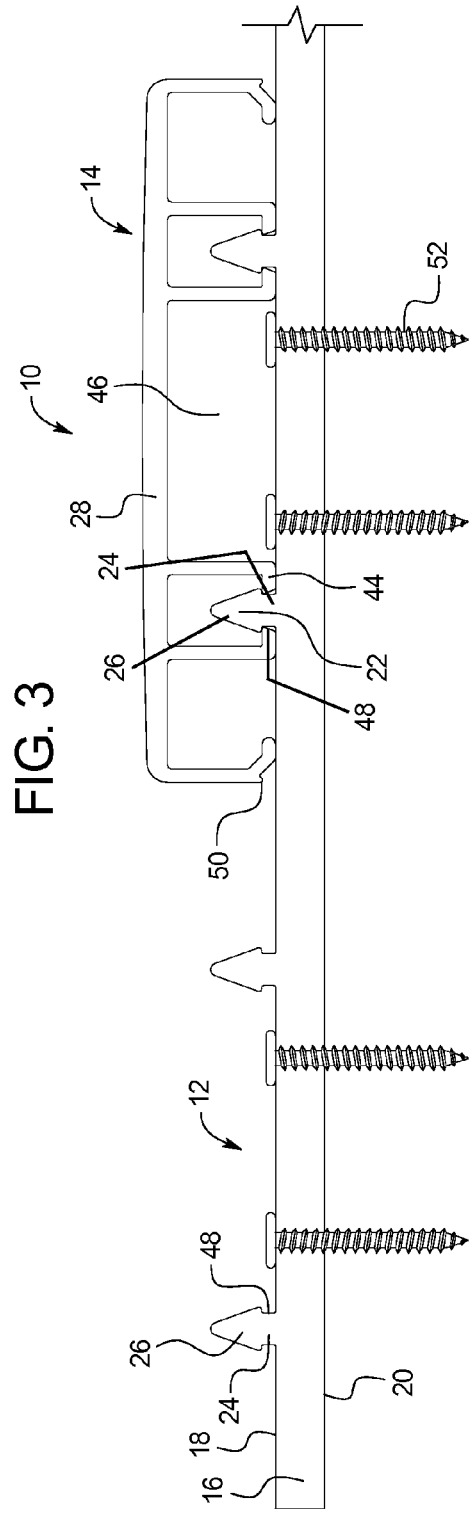

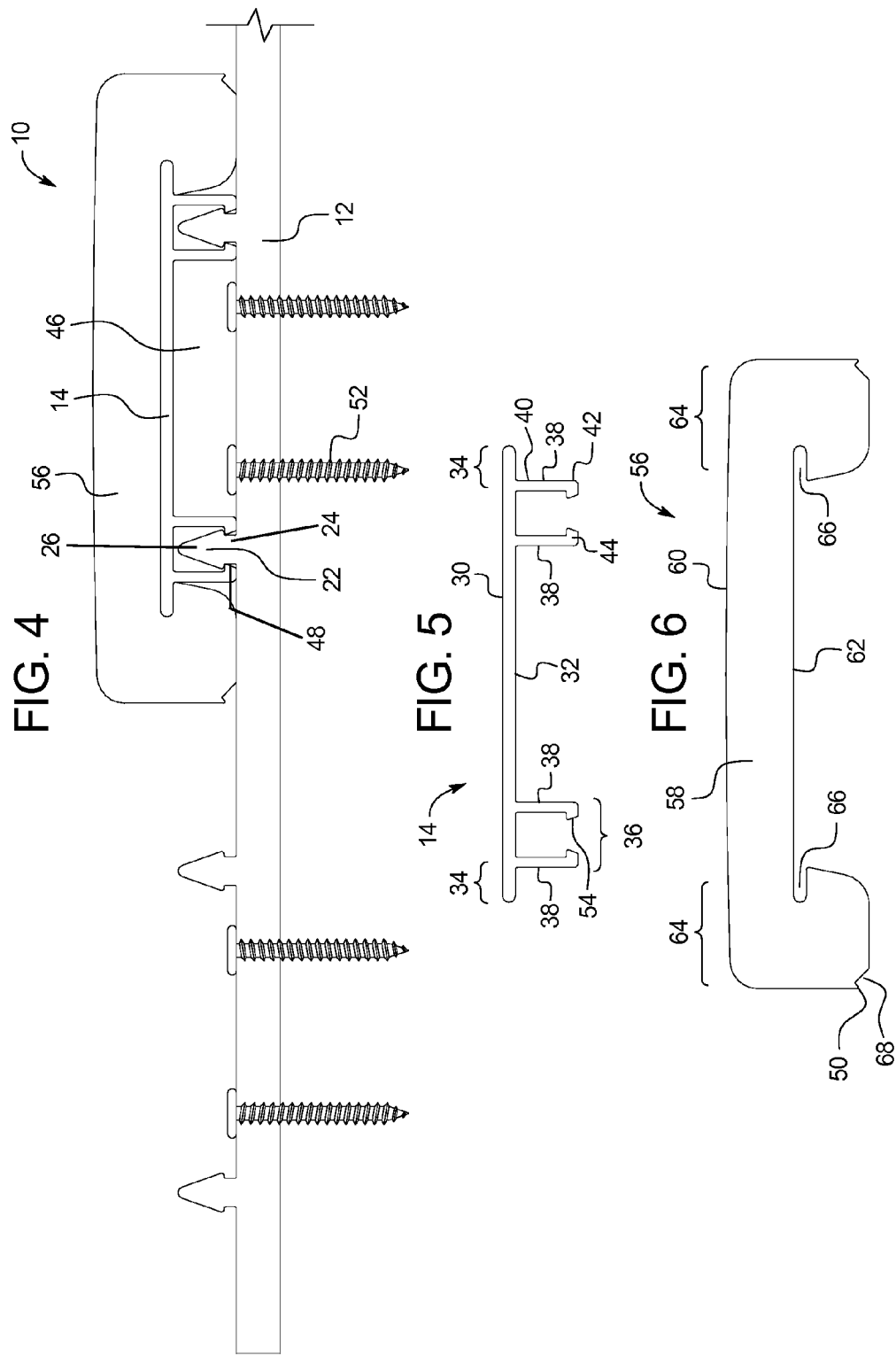

SNAP LOCK DECKING SYSTEM

CROSS-REFERENCE TO RELATED APPLICATIONS

This application incorporates by reference and claims priority to U.S. Provisional Application 61/786,325 filed on Mar. 15, 2013.

BACKGROUND OF THE INVENTION

The present subject matter relates generally to decking systems. More specifically, the present invention relates to a plastic or composite exterior decking system that includes a simple snap locking fastener system for installation.

Previous decking solutions suffer from several drawbacks. For example, conventional decking solutions require complicated and cumbersome installation of current deck products. For example, the decking solutions often included a user to manually space and align each deck board for the proper installation of the deck boards. Such solutions result in many failed attempts at evenly spaced deck boards and hours of frustration on the user's behalf.

Further, previous decking solutions lack weather protection for underlying deck joists. As a result, existing systems often have exposed fasteners that detract from the appearance of the deck and allow the elements to directly effect the fasteners causing them to rust or discolor.

In addition, previous decking solutions are typically made in designs and of materials that degrade in response to expansion and contraction caused by seasonal fluctuations in temperature.

Accordingly, there is a need for a decking system that is simple to install, spaces itself automatically, provides weather protection to the deck joists and fasteners, and resists degradation due to expansion and contraction, as described herein.

BRIEF SUMMARY OF THE INVENTION

The present disclosure provides a solution to the above mentioned problems. Specifically, the system may include a receiver and deck plank, wherein the plank removeably connects to receiver for installation. For example, the receiver may provide a snap lock function that secures and automatically spaces the deck planks on the receiver, which is fastened to a deck joist. The receiver may further act as a flashing for the deck joists to protect the deck joists from the elements. In addition, the planks are adapted to snap onto the snap lock receiver and act as a cover to protect the underlying fasteners. The receiver may be injection molded from any of a number of different materials including, but not limited to, aluminum, polyvinyl chloride (PVC), and polypropylene, to name a few. The planks may be extruded from any number of different materials including, but not limited to, aluminum, polyvinyl chloride (PVC), and polypropylene, to name a few.

The receiver is installed directly on a deck joists and acts as a receiver for the plank while also acting as a flashing for the deck joist. The receiver includes a plurality of retainers that provide automatic spacing for the deck planks. For example, once the receiver is in place the deck planks are simply pressed or snapped on to the receiver. The decking planks are adapted to shed water and resist the accumulation of water, ice or snow by incorporating a design that includes a convex plank top surface, a point for a continuous drop, and a void in the plank edge to allow for proper water drainage. Once installed if a single deck plank needs to be removed for whatever reason the planks can simply be slid off the end and reinstalled.

In an embodiment, the system includes a receiver and plank, wherein the receiver includes a receiver body including a receiver top surface and an receiver bottom surface. The receiver further includes a retainer extending from the receiver top surface, wherein the retainer has a retainer first end and a retainer second end, wherein the retainer first end extends from the retainer interior surface. The retainer second end may be conical shaped. In yet another example, the retainer is integrally formed with the receiver.

The plank includes a plank body including a plank top surface, plank bottom surface, and two plank edges. The plank may be a deck board. In an example, the plank top surface is convex. The plank further includes a set of arms extending perpendicular from the plank bottom surface, wherein each arm includes an arm first end and an arm second end, wherein the arm first end extends from the plank bottom surface, wherein the arm second end includes a tab extending parallel to the plank body. The retainer first end is configured to receive the tabs of the set of arms. When the tabs of the arms are engaged with the retainer of the receiver, the arms maintain a space between the receiver top surface and the plank bottom surface. The tab may include a tab end that is tapered.

The receiver may include a plurality of retainers periodically spaced along a length of the receiver. The retainer first end includes a retainer groove on each side of the retainer for receiving the tabs of a set of arms.

In an example, each plank edge includes an arm extending from the interior surface of the plank body, wherein the arm second end includes a tab extending parallel to the plank of the body. In addition, the arm second end may include a point to enable a continuous drip from the plank.

The system may further include at least one fastener configured to connect the receiver to a deck joist, wherein at least a portion of the fastener resides in a portion of the space between the receiver top surface and the plank bottom surface.

In another embodiment, the system includes a receiver, a plank, and a deck board. The receiver includes a receiver body including a receiver top surface and a receiver bottom surface. The receiver further includes a retainer extending from the receiver top surface, wherein the retainer has a retainer first end and a retainer second end, wherein the retainer first end extends from the receiver top surface. In an example, the retainer is integrally formed with the receiver.

The plank includes a plank top surface, plank bottom surface, and two plank edges. The plank further includes a set of arms extending perpendicular from the plank bottom surface, wherein each arm includes an arm first end and an arm second end. The arm first end extends from the plank bottom surface, wherein the arm second end includes a tab extending parallel to the plank body.

The deck board includes a deck board body including a board bottom surface, a board top surface, and board ends, wherein the deck board body is configured to mate with the plank body. In an example, when the deck board body mates with the plank body, the deck board body conceals the plank from view. The deck board ends may include a board groove for receiving the plank edges. In another example, the deck board ends include a point to enable a continuous drip from the deck boards.

The retainer first end is configured to receive the tabs of the set of arms. When the tabs of the arms are engaged with the retainer of the receiver, the arms maintain a space between the receiver top surface and the plank bottom surface.

The system may include at least one fastener configured to connect the receiver to a deck joist, wherein at least a portion of the fastener resides in a portion of the space between the receiver top surface and the plank bottom surface.

An objective of the invention is to provide a solution to the complicated and cumbersome installation of current deck products, including providing a solution to spacing of the deck planks.

Another objective is to provide weather protection to the deck joists and to resist degradation and other issues due to seasonal expansion and contraction, as well as a means of concealing the installation fasteners.

An advantage of the present system is that it simplifies a decking installation process by providing a system that inherently provides equal spacing for the deck planks.

A further advantage of the present system is that it conceals the installation fasteners, making it more aesthetically pleasing while providing protection to the installation fasteners from the environmental elements.

Another advantage of the invention is that it provides improved water control and does not allow moisture to accumulate anywhere in or on the system.

Yet another advantage is that the positioning of the installation screws is directly below the decking board, thus they are concealed and out of sight and are also out of direct exposure to weather.

A further advantage of the invention is that the use of materials and designs that resist degradation due to seasonal expansion and contraction.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 is a side cross-sectional view of an embodiment of the system disclosed herein including a plank installed onto the receiver.

FIG. 3 is a side cross-sectional view of an example of a plank disclosed herein.

FIG. 4 is a side cross-sectional view of an embodiment of the system disclosed herein including a deck board installed on a plank, which is installed on a receiver.

FIG. 5 is a side cross-sectional view of an embodiment of a plank disclosed herein.

FIG. 6 is a side cross-sectional view of an embodiment of a deck board disclosed herein.

DETAILED DESCRIPTION OF THE INVENTION

Figure 1:
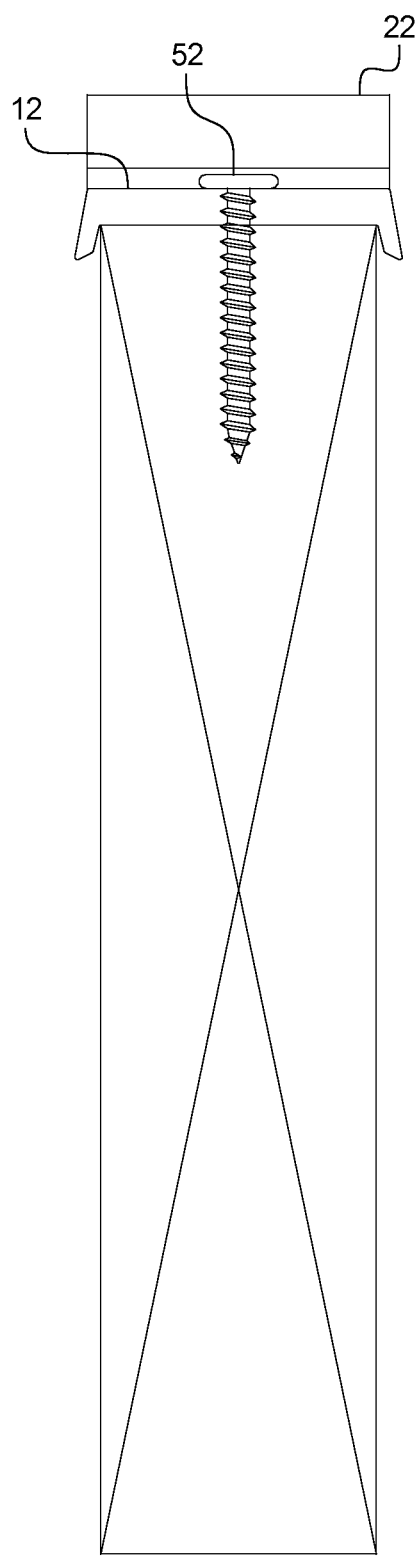
FIG. 1 is a front cross-sectional view of an embodiment of the system in combination with a deck joist.

As shown in FIGS. 1-2, the present disclosure provides a decking system 10 that includes a receiver 12 and plank 14 that may removeably attach to each other. For example, the plank 14 may snap, slide, or otherwise temporarily lock into the receiver 12.

FIG. 2 depicts the receiver 12 including a generally linear receiver body 16 including a receiver top surface 18 and a receiver bottom surface 20. The receiver 12 further includes a retainer 22 extending from the receiver top surface 18. The retainer 22 may be integrally formed with the receiver 12, or a separate entity that is otherwise attached to the receiver 12. As shown in FIG. 2, the receiver 12 may include a plurality of retainers 22. The retainers 22 may be spaced periodically such that the position of the retainers 22 on the receiver 12 enables a user to attach planks 14, such as deck boards, that will automatically be aligned. In other words, the spacing of the retainers 22 prevents users from having to measure and align the deck boards themselves, a frustrating and cumbersome process.

The retainer 22 has a retainer first end 24 and a retainer second end 26, wherein the retainer first end 24 extends from the receiver top surface 18. The retainer 22 may have any suitable shape. In an example, the retainer second end 26 may be conical shaped. Although, it is contemplated that the shape of the retainer second end 26 may be spherical, square, or rectangular, among other shapes.

The plank 14 includes a generally linear plank body 28 including an plank top surface 30, plank bottom surface 32, and two plank edges 34. In an example, the plank 14 is a deck board. The plank 14 and receiver 12 may be independently made from any of a number of different materials including, but not limited to, aluminum, polyvinyl chloride (PVC), and polypropylene, among others.

The plank top surface 30 may be convex such that rain and water run off the plank edges 34. The plank 14 also includes a set of arms 36 extending perpendicular from the plank bottom surface 32, wherein each set of arms 36 includes two arms 38. Each arm 38 includes an arm first end 40 and an arm second end 42, wherein the arm first end 40 extends from the plank bottom surface 32.

As shown in FIG. 3, the arm second end 42 includes a tab 44 extending parallel to the plank body 28. Within a set of arms 36, the two tabs 44 of separate arms 38 may be pointed towards each other. The tab 44 may include a tab end 54 that is tapered. The tapered shape of the tab end 54 may facilitate a user in snapping the plank 14 into place around the retainer 22. Of course, it is contemplated the tab end 54 may be any suitable shape for facilitating temporarily locking the tab 44 around the retainer groove 48. For example, the tab end 54 may be round.

The retainer first end 24 is configured to receive the tabs 44 of the set of arms 36. For example, the retainer first end 24 may include a retainer groove 48 on each side of the retainer 22 for receiving the tabs 44 of a set of arms 36.

When the tabs 44 of the arms 38 are engaged with the retainer 22 of the receiver 12, the arms 38 maintain a space 46 between the receiver top surface 18 and the plank bottom surface 32. In an example, the system 10 may further include at least one fastener 52 configured to connect the receiver 12 to a deck joist. The fastener 52 may be any suitable fastener 52 that connects the receiver to structure, such as a deck joist. For example, the fastener 52 may be a screw, nail, clamp, staple, latch, pin, or anchor, among others.

As shown in FIG. 2, at least a portion of the fastener 52 resides in a portion of the space 46 between the receiver top surface 18 and the plank bottom surface 20. For example, when the fastener 52 is a screw, the head of the screw may reside in the space 46 between the receiver top surface 18 and the plank bottom surface 32.

As shown in FIG. 3, each plank edge 34 may include an arm 38 extending from the plank bottom surface 32, wherein the arm second end 42 includes a tab 44 extending parallel to the plank body 28. In addition, the arm second end 42 may include a point 50 to enable a continuous drip from the plank 14. For example, the point 50 may be located on a corner between the arm 38 and the tab 44. As shown in FIG. 3, the plank edge 34 may include a corner between the arm 38 and the tab 44, wherein a portion of the corner is a void 68 to allow water drainage from the plank edges 34.

In another embodiment, the system 10 includes a receiver 12, a plank 14, and a deck board 56. Similarly to the receiver 12 and plank 14, the deck board 56 may be made from any of a number of different materials including, but not limited to, aluminum, polyvinyl chloride (PVC), and polypropylene, among others. As shown in FIG. 4, the plank 14 removeably attaches to the retainers 22 of the receiver 12. In addition, the deck board 56 removeably attaches to the plank 14, such that the deck board 56 conceals the plank 14 from view.

As shown in FIG. 6, the deck board 56 may include a deck board body 58 including a board bottom surface 62, a board top surface 60, and board ends 64. The deck board body 58 is configured to mate with the plank 14. For example, the deck board ends 64 may include a board groove 66 for receiving the plank edges 34.

In contrast to the example in FIG. 3, the example of the plank 14 in FIG. 5 does not include arms 38 extending from the plank edges 34. As a result, the plank edges 34 may be positioned within the board grooves 66 of the deck board 58. The plank edges 34 may be snapped, slid, or otherwise removeably attached to the deck board 58.

In another example, the deck board ends 64 include a point 50 to enable a continuous drip from the deck boards 56. As shown in FIG. 6, the deck board ends 34 may include a corner that includes the point 50. The corner may further include a void 68 that allows for proper drainage of the water.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and portable electronic device may be provided based on various combinations of the features and functions from the subject matter provided herein.

We claim:

1. A decking system comprising:
   a receiver including
      a receiver body including a receiver top surface and a receiver bottom surface, and
      a retainer extending from the receiver top surface, wherein the retainer has a retainer first end and a retainer second end, wherein the retainer first end extends from the receiver top surface; and
   a plank including
      a plank body including a plank top surface, plank bottom surface, and two plank edges, and
      a set of arms extending perpendicularly from the plank bottom surface, wherein each arm includes an arm first end and an arm second end, wherein the arm first end extends from the plank bottom surface, wherein the arm second end includes a tab extending parallel to the plank body, and
   a deck board removeably attached to the plank such that the deck board conceals the top and sides of the plank from view;
   wherein the retainer first end is configured to receive the tabs of the set of arms,
   wherein, when the tabs of the arms are engaged with the retainer of the receiver, the arms maintain a space between the receiver top surface and the plank bottom surface.

2. The system of claim 1 wherein the retainer first end includes a retainer groove on each side of the retainer for receiving the tabs of the set of arms of the plank.

3. The system of claim 1 wherein the receiver includes a plurality of retainers periodically spaced along a length of the receiver.

4. The system of claim 1 wherein the deck board includes first and second deck board ends, wherein each deck board end includes a point to enable a continuous drip from the plank.

5. The system of claim 1 further comprising at least one fastener configured to connect the receiver to a deck joist, wherein at least a portion of the fastener resides in a portion of the space between the receiver top surface and the plank bottom surface.

6. The system of claim 1 wherein the plank top surface is planar.

7. The system of claim 1 wherein the tab includes a tab end that is tapered.

8. The system of claim 1 wherein the retainer second end has an elongate pointed shape.

9. The system of claim 1 wherein the retainer is integrally formed with the receiver.

10. A decking system comprising:
    a receiver including
       a receiver body including a receiver top surface and a receiver bottom surface, and
       a retainer extending from the receiver top surface, wherein the retainer has a retainer first end and a retainer second end, wherein the retainer first end extends from the receiver top surface; and
    a plank including
       a plank body including a plank top surface, plank bottom surface, and two plank edges, and
       a set of arms extending perpendicularly from the plank bottom surface, wherein each arm includes an arm first end and an arm second end, wherein the arm first end extends from the plank bottom surface, wherein the arm second end includes a tab extending parallel to the plank body; and
    a deck board including
       a deck board body including a board bottom surface, a board top surface, and board ends, wherein the deck board body is configured to mate with the plank body such that the deck board conceals the top and sides of the plank from view,
    wherein the retainer first end is configured to receive the tabs of the set of arms,
    wherein, when the tabs of the arms are engaged with the retainer of the receiver, the arms maintain a space between the receiver top surface and the plank bottom surface.

11. The system of claim 10 wherein the deck board ends include a board groove for receiving the plank edges.

12. The system of claim 10 wherein each of the deck board ends includes a point to enable a continuous drip from the deck boards.

13. The system of claim 10 further comprising at least one fastener configured to connect the receiver to a deck joist, wherein at least a portion of the fastener resides in a portion of the space between the receiver top surface and the plank bottom surface.

14. The system of claim 10 wherein, when the deck board body mates with the plank body, the deck board body conceals the plank from view.

15. The system of claim 10 wherein the retainer is integrally formed with the receiver.

\* \* \* \* \*